Patented Jan. 10, 1928.

1,655,795

UNITED STATES PATENT OFFICE.

FRITZ MÜLLER, OF BASEL, SWITZERLAND, ASSIGNOR TO CHEMICAL WORKS FORMERLY SANDOZ, OF BASEL, SWITZERLAND, A FIRM.

PHARMACEUTICAL PRODUCT.

No Drawing. Application filed May 18, 1927, Serial No. 192,484, and in Switzerland June 3, 1926.

This invention relates to the manufacture of a new pharmaceutical product, being a double compound of allylisobutylbarbituric acid of the formula:

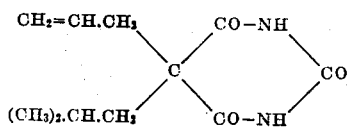

and 1-phenyl-2, 3-dimethyl-4-dimethylamino-5-pyrazolon of the formula:

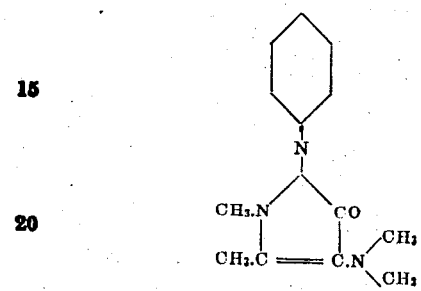

The new compound forms a yellowish crystalline powder, which is soluble in alcohol, methanol, ether, practically insoluble in petroleum spirit. It possesses valuable hypnotic and analgetic properties.

It is obtained by allowing the above mentioned substances to react on each other, either in solution or by melting them together.

*Example 1.*

231 parts by weight of 1-phenyl-2, 3-dimethyl-4-dimethylamino-5-pyrazolon and 224 parts by weight of allylisobutylbarbituric acid are heated together at about 120° C. The mixture melts and a yellow fusion is obtained, which solidifies on cooling to a crystalline yellowish mass.

*Example 2.*

231 parts by weight of 1-phenyl-2, 3-dimethyl-4-dimethylamino-5-pyrazolon and 224 parts by weight of allylisobutylbarbituric acid are dissolved in sufficient quantities of methanol. When concentrating the solution the new double compound separates.

What I claim is:

The herein described new compound, consisting of allylisobutylbarbituric acid and 1-phenyl-2, 3-dimethyl-4-dimethylamino-5-pyrazolon, which compound forms a yellowish crystalline powder and is soluble in alcohol, methanol, ether, practically insoluble in petroleum spirit, possessing valuable hypnotic and analgetic properties, substantially as described.

In witness whereof I have hereunto signed my name this 7th day of May, 1927.

FRITZ MÜLLER.